May 24, 1955   A. DAHLSTROM   2,709,004
DISPLAY STAND
Filed June 13, 1952   2 Sheets-Sheet 1
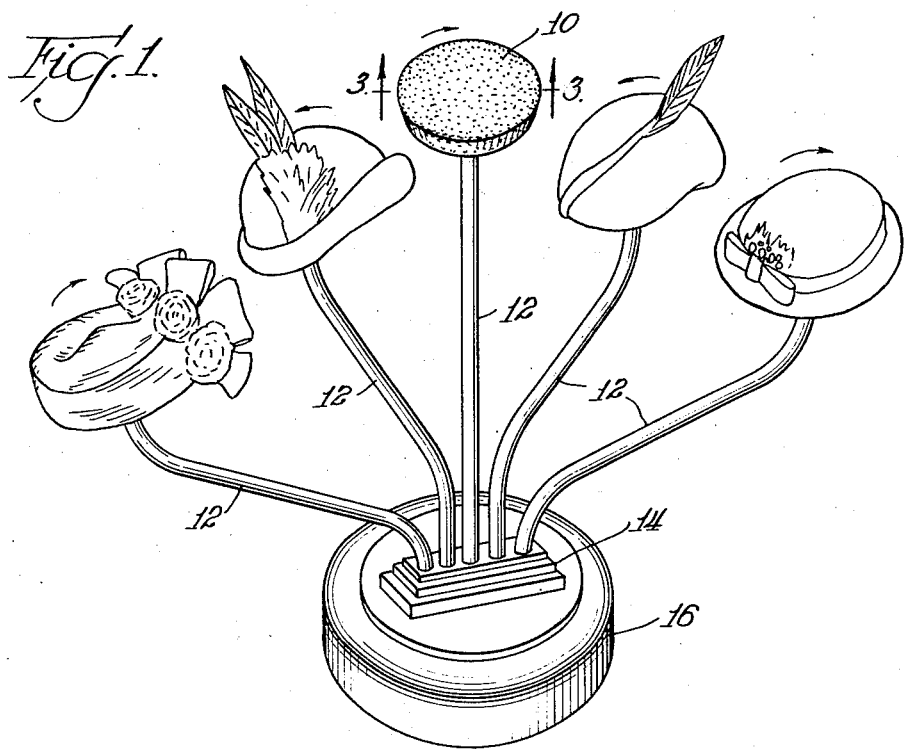
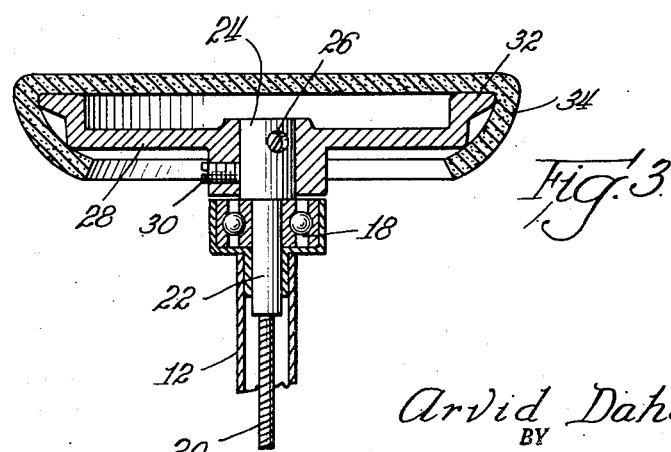
INVENTOR.
Arvid Dahlstrom
BY
Mann Brown and Hansmann
Attys May 24, 1955  A. DAHLSTROM  2,709,004
DISPLAY STAND
Filed June 13, 1952  2 Sheets-Sheet 2
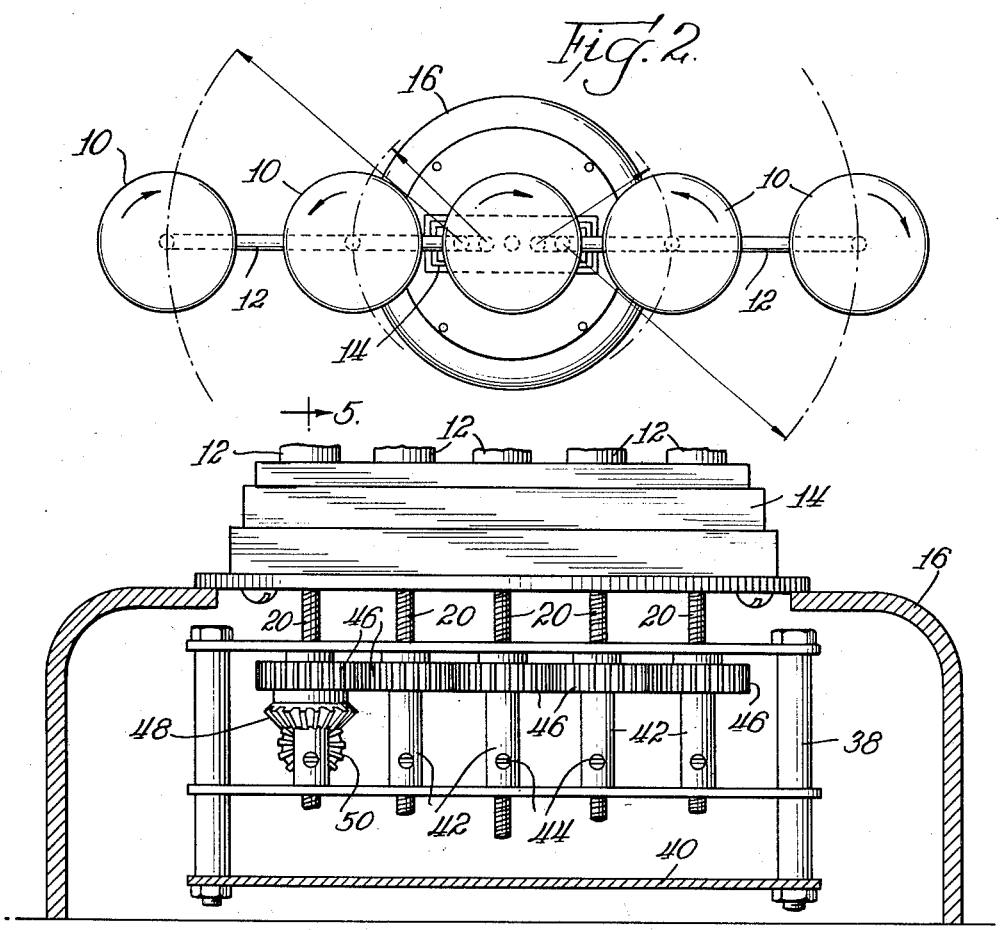
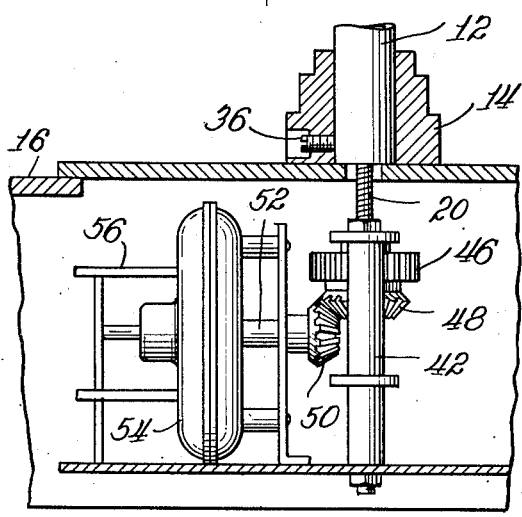
INVENTOR.
Arvid Dahlstrom
BY
Mann, Brown and Hansmann
Attys

United States Patent Office 2,709,004
Patented May 24, 1955

2,709,004
DISPLAY STAND

Arvid Dahlstrom, Chicago, Ill., assignor to J. H. Keeney & Co., Inc., Chicago, Ill., a corporation of Illinois Application June 13, 1952, Serial No. 293,300

2 Claims. (Cl. 211—1.6)

My invention relates to display stands and is more particularly concerned with but not limited to display stands for ladies' hats. Most display stands for ladies' hats hold the hat stationary so that the prospective customers viewing the hats displayed in a store window or case cannot see all sides of the hats. There is an existing need for a simple, inexpensive, and attractive display stand which will hold and rotate a plurality of ladies' hats, and one object of my invention is to satisfy this need.

Another object of my invention is to provide a stand on which the hats or other articles may be displayed in various arrangements.

Another object of my invention is to provide a stand which can be made in various sizes to accommodate different numbers of hats or other articles.

Other objects and advantages will become apparent as the description proceeds in conjunction with the accompanying drawings, in which:

Fig. 1 is a perspective view of a display stand embodying my invention;

Fig. 2 is a top plan view of the stand shown in Fig. 1;

Fig. 3 is a vertical sectional view through one of the hat supports and is taken on the line 3—3 of Fig. 1;

Fig. 4 is an enlarged elevational view of the base with part of the housing cut away to show the operating mechanism; and Fig. 5 is a partial vertical sectional view taken on the line 5—5 of Fig. 4.

In general, my novel display stand comprises a plurality of disc-like supporting elements 10 for holding and rotating ladies' hats or other similar articles. These rotatable supports 10 are mounted on the upper ends of arms 12 supported at their lower ends in a block 14 mounted on a base 16 in the form of a housing carrying operating mechanism for rotating these supports 10 and the articles supported thereon.

Referring to Fig. 3 it will be seen that the arms 12 are in the form of rigid tubular members carrying ball bearings 18 at their upper ends. Flexible cables 20 like those used to drive automobile speedometers extend lengthwise of the arms 12 and are attached at their upper end to rigid shafts 22 supported in the ball bearings 18. The hub 24 is attached by a set screw 26 to each shaft 22, and a metal plate 28 is removably fixed to the hub 24 by a set screw 30. Each plate 28 has an annular upstanding edge 32 over which may be stretched a cap 34 of sponge rubber or other material which is preferably of such a nature that it will not injure the hat or other article supported therein but will provide a frictional engagement therewith and is easily cleaned.

The lower ends of the arms 12 are received in sockets in the block 14 and are free to pivot therein. When desired, the arms may be locked in any adjusted position by set screws 36.

A frame indicated generally by reference character 38 (Fig. 4) is mounted on a plate 40 and provides bearings for a plurality of shafts 42 corresponding in number to the number of arms 12. The shafts 42 are hollow and each shaft is attached to a flexible cable 20 by means of a set screw 44. Each shaft 42 also carries a gear 46 of such size as to engage the gears of adjacent shafts as clearly indicated in Fig. 4.

One of the shafts 42 also carries a bevel gear 48 which is driven by a second bevel gear 50 mounted on the shaft 52 of an electric motor 54. The motor 54 and its shaft 52 are mounted in a second frame 56, also attached to and supported on the plate 40. This plate 40 is preferably attached to the housing 16 by any suitable means.

The motor 54 is provided with the usual cord and plug so that it may be connected to a conventional wall or floor outlet. The motor is preferably of the synchronous type and incorporates reduction gearing or is of a low speed design so that the hat supports are rotated slowly. I have found that a rotative speed of from five to ten rotations per minute is suitable for most purposes, although it is to be understood that my display stand can be designed to provide any speed of rotation desired.

In the particular stand shown in the drawings, I have provided five arms as this has proved to be a desirable number for most purposes. In this particular arrangement the center arm is straight and carries its support 10 at a higher elevation than the other arms. The arms on each side of the center are bent outwardly so that their upper ends and the supports carried thereby are laterally displaced from the center support and are at a lower level than the center support. The outside arms are bent laterally to a still greater extent and carry their supports at a still lower level.

The lower ends of the arms are pivotally carried in the block 14 so that the upper ends of the arms may be adjusted to give any desired and attractive arrangement of the articles displayed thereon. The supports carried by the outer arms move in arcs laterally outward of the arcs described by the supports carried by the intermediate arms to provide a great variety of arrangements. The arms can be locked in any adjusted positions by means of the set screws 36.

Since the gears 46 attached to the several flexible shafts form a continuous chain, alternate shafts and the hat supports connected thereto are driven in opposite directions. This arrangement has been found to increase the attractiveness of the display.

If only the center and two adjacent arms are desired, the end arms can be easily removed by loosening their set screws 36 and the set screws 44 which connect their flexible cables 20 to their shafts 42. Likewise, the center and end arms can be utilized and the intermediate arms removed. After having been removed, the arms can be readily reinserted in their sockets and the lower ends of their flexible cables reinserted in shafts 42, and the respective set screws tightened to reestablish the arms in full operating condition. Because of this ease of disassembly and reassembly, any suitable number and arrangement of arms may be utilized, and this greatly increases the flexibility of my novel display apparatus.

While I have illustrated a display unit providing a maximum of five arms, it is to be understood that my new and improved display stand is not limited to this number of arms but may be made in units having three, seven, or other number of arms, and, if desired, in all such units most of the parts can be interchangeable.

From the foregoing it will be apparent that I have provided a simple, inexpensive, and attractive display stand which may be readily assembled and disassembled and which has great versatility whereby it may be adapted to a wide variety of physical conditions and individual preferences. It is to be understood that my invention is not limited to the details shown, but may assume a wide variety of forms, and includes all modifications, variations, and equivalents coming within the scope of the appended claims.

I claim:
1. A display stand of the class described comprising a hollow base, a plurality of tubular arms, means adjustably and pivotally mounting the arms on said base, a bearing carried at the upper end of each of said arms, a flexible shaft extending through each of said arms and having a part carried in said bearing, a rotatable support attached to the upper end of each of said shafts, said supports being in different horizontal and vertical planes, each of said shafts having a second end located in said base, a gear attached to the latter end of each of said shafts with the adjacent gears meshing with each other, and a motor in said base for driving alternate gears in opposite directions.

2. In a display stand having a hollow base, a plurality of aligned parallel shafts mounted in said base, a gear mounted on each of said shafts in substantially coplanar relationship, with the gears of adjacent shafts in engagement to form a continuous chain, and a motor mounted in said hollow base and connected with one of said parallel shafts whereby all of said shafts are rotated, a plurality of tubular arms pivotally mounted on said base, means for restraining the arms in any selected pivoted position, a bearing carried at the upper end of each of said arms, a flexible shaft extending through each of said arms and having a part carried in said bearing, and a rotatable support mounted on each arm and attached to the upper end of each of said flexible shafts, the other ends of said flexible shafts being attached to said parallel shafts, the arms maintaining said supports in planes angularly inclined relative to one another.

References Cited in the file of this patent

UNITED STATES PATENTS

| | | |
|---|---|---|
| 275,209 | Heineke | Apr. 3, 1883 |
| 493,248 | Conklin | Mar. 14, 1893 |
| 1,009,452 | Thum et al. | Nov. 21, 1911 |
| 1,169,954 | Halliday | Feb. 1, 1916 |
| 1,510,157 | Pemberton | Sept. 30, 1924 |
| 1,768,217 | Schlick | June 24, 1930 |
| 2,165,727 | Reymers | July 11, 1939 |

FOREIGN PATENTS

| | | |
|---|---|---|
| 10,702 | Norway | May 25, 1901 |
| 77,508 | Switzerland | Apr. 16, 1918 |